(Model.)
B. B. HILL.
CHRONOMETRIC STAMP.
No. 266,366. Patented Oct. 24, 1882.
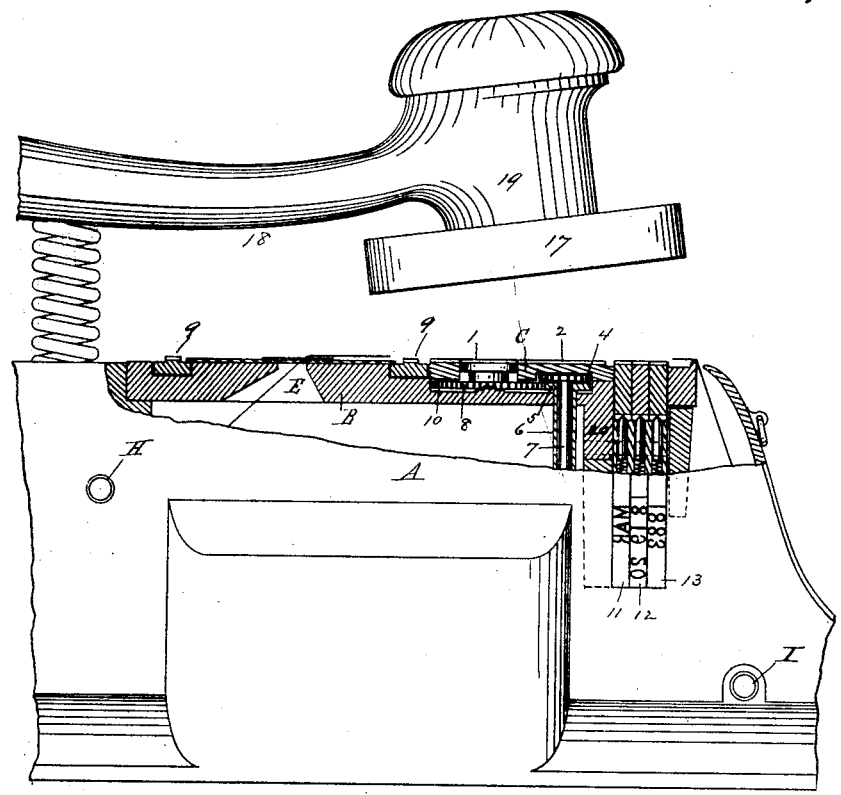
Fig. I.
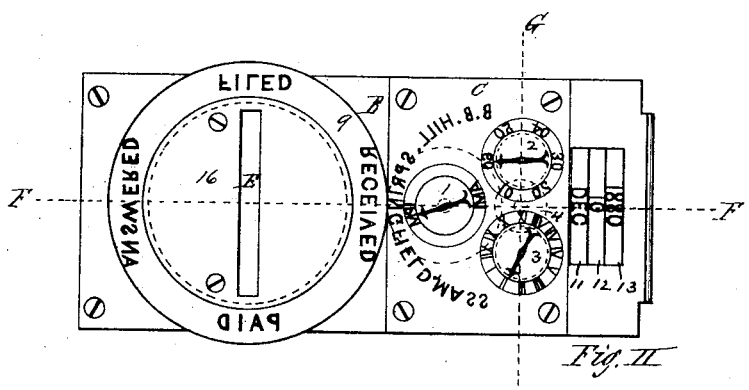
Fig. II.
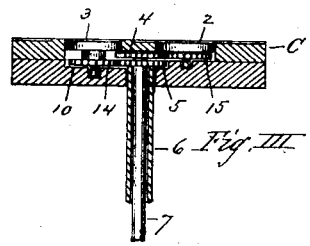
Fig. III.
Witnesses,
Ira B. Allen
H. D. Taylor
Inventor.
Benjamin B. Hill.
By T. A. Curtis.
his atty.

UNITED STATES PATENT OFFICE.

BENJAMIN B. HILL, OF SPRINGFIELD, MASSACHUSETTS.

CHRONOMETRIC STAMP.

SPECIFICATION forming part of Letters Patent No. 266,366, dated October 24, 1882.

Application filed December 18, 1880. (Model.)

*To all whom it may concern:*

Be it known that I, BENJAMIN B. HILL, of Springfield, in the county of Hampden and State of Massachusetts, have invented a new and useful Improvement in Chronometric Stamps, of which the following is a specification.

The object of my invention is to overcome certain difficulties which have been found in the use of this kind of stamps as ordinarily heretofore constructed; and to this end I have invented a peculiar arrangement of the printing-dies, whereby these difficulties have been overcome, the peculiar features of which will be hereinafter more fully described and claimed.

Previous to my invention stamps had been made having time-movements attached for giving motion to a series of circular dial-dies nested one within the other, as shown in the Patent No. 139,154, issued to J. C. Hinchman, May 20, 1873. Other chronometric stamps had been made in which two index-dies were used, also nesting one within the other, and both working in the same dial, as in the Patent No. 224,666, issued to G. E. Emerson, February 17, 1880; and many different styles of clocks have been made at varying periods, in which separate dials and indexes were used for pointing out different divisions of time. These separate dials and indexes, however, had never been employed, and were incapable of being used for producing an impression or record, but were simply used to point out the time.

To overcome the difficulties inherent in the chronometric stamps heretofore used, I have invented and constructed an organized mechanism wherein these separate dials and indexes are capable of producing a printed impression or record, in the manner hereinafter described, and shown in the accompanying drawings, in which—

Fig. I is a partial side elevation of a stamp having my invention applied, and with a vertical section of the die-plate on line F of Fig. II, showing the die-operating mechanism. Fig. II is a plan view of the die-plate, showing the arrangement of the dies therein; and Fig. III is a transverse vertical section of the die-plate and dies, showing the mechanism for operating the latter.

A represents the base of the stamp, within which is located a clock-movement, from which a hollow shaft, 6, extends upward, having a toothed wheel, 5, firmly secured to its upper end, which shaft and wheel are rotated by the said clock-movement below, and a shaft, 7, connected at its lower end with the clock-movement, extends up through the hollow shaft 6, with a toothed wheel, 4, on its upper end, which shaft and wheel are also revolved by the clock-movement below, the rotary movement of the shaft 7 and its wheel being entirely independent of the movement of the hollow shaft 6 and its wheel.

The die-plate is recessed at 10 to receive the meridian-index 1, with the large toothed wheel 8 secured to its lower side, the minute-index die 2, with the smaller toothed wheel 15 secured to its lower side, and the hour-index die 3, with the toothed wheel 14 secured to its lower side, and also to receive the toothed wheels 5 and 4, respectively secured to the upper ends of the shafts 6 and 7.

The cap-plate C has holes made through it to receive the index-dies 1, 2, and 3, and has also characters made thereon around the die 3, indicating the hour, similar to those on an ordinary clock, and around the die 2 characters are made to indicate the minutes of the hour at intervals, and the circles around the meridian-die 1 may be divided into two parts, indicated by a line or by points on opposite sides, with certain characters, as A. M., on one side or half of the circle, to indicate antemeridian, and the other characters, as P. M., on the opposite side, to indicate afternoon or post-meridian, and this arrangement of raised printing-characters on the circles around the index-dies 1, 2, and 3 is essential to the use of the said index-dies, and each such circle of raised printing-characters constitutes a dial-die to be used in connection with its appropriate index-dies. Any other desired printing matter may be made on the plate C or attached thereto, near to and surrounding the dies 1, 2, and 3, or any of them.

The plate B is recessed to receive the ring 9, having any desired printing-characters thereon—such as "paid," "filed," or other matter, which ring is loosely secured by a retaining-cap, 16, screwed to the plate B, so that the ring may be turned to bring any desired printing-characters thereon beneath the pad 17. A part of the plate B may extend downward at 20, at right angles to the main part of said plate, with the type-wheels 11 12 13 pivoted thereto, and the printing-characters on their peripheries projecting up through the plate B to the same horizontal plane as the index-dies 1 2 3 and the dial-dies surrounding them, and as the characters on the ring 9, which plane is a little above the top of the plate B.

The general form of the stamp may be similar to those already in use and well known, and with an arm, 18, pivoted to the base and provided with a hand-piece and impression-pad, 17, and an inking-ribbon may extend from a winding-roll, H, up through a slot, E, thence extend over the dies and printing-characters and down to a reel, I, and said ribbon may be moved automatically or otherwise.

The parts are put together and used as follows: The clock being placed in the desired position, the plate B is secured to the top of the base A without its cap C by inserting the upper ends of the shafts 6 and 7 up through the hole therefor in the plate, and afterward securing the toothed wheels 4 and 5 to their upper ends; or the said shafts may be inserted down through the hole in the plate from above, with the wheels 4 and 5 already secured, and the lower ends of their shafts afterward connected with the clock-movement. The index-dies 1, 2, and 3 are then put in place in their recesses in the plate B by screws or otherwise, with the printing matter on the plate C, the ring 9, the dies, and the type-wheels all arranged on the same horizontal plane.

The position of the toothed wheel 8, attached to the die 1, the toothed wheel 14 on the die 3, and the toothed wheel 15 on the die 2, are all clearly shown in dotted lines in circles around the centers of the index-dies 1, 2, and 3 in Fig. II, and the position of the toothed wheels 4 and 5 is shown in dotted lines at 4 in Fig. II, the toothed wheel 5 being shown in section in Fig. I.

The toothed wheel 4 on the upper end of the shaft 7 gears with the wheel 15, attached to the die 2, and causes that wheel and die to make one revolution in one hour; and the wheel 5 on the upper end of the hollow shaft 6 gears with the wheel 14 on die 3, causing said wheel and die to make only one-twelfth of a revolution in one hour, and said wheel 5 also gears with the larger toothed wheel 8 on the die 1, causing said die to make one revolution in twenty-four hours.

Suppose the dotted line F in Fig. II to represent the meridian-line, one point on said line on the upper side of the circle, surrounding the die 1, (holding the drawing with the ring 9 uppermost,) indicating 12 o'clock at noon, and a point opposite on said line F indicating 12 o'clock at night. When the index-die 1 passes the uppermost point on said line F the characters P. M. on that half of the circle indicate that it is after 12 o'clock at noon as long as said die 1 points to that half of the circle on which said characters are made, and when the die passes the lower or opposite point on the circle, the letters A. M. indicate that it is after 12 o'clock at night and before 12 o'clock at noon as long as the die points to that half of the circle containing the letters A. M. When the ink-ribbon is stretched over the printing-characters and index-dies 1 2 3 and a paper is held between the ribbon and the pad 17 and the latter struck down upon the paper and dies an exact impression is made of the dies, and as the index-dies are actuated by the clock-movement the actual time of taking the impression is indicated thereon.

The meridian-index die 1 being operated automatically by the clock-movement no care is required in looking after it or to turn it, as it is now required to be done in some stamps.

It will be seen that by my construction the liability of the clock movements being stopped by the friction caused by the collection of dust, dirt, or ink between the contiguous parts of the index or dial dies is reduced to a minimum, as the dies do not nest one within the other.

It will also be seen that each die is made solid, whereby it is more cheaply made, and having a solid central bearing to receive the force of the blow it is not likely to be broken in receiving the impression.

By my construction, also, each and all of the dials can have the connection with the clock-movement near their peripheries, and thus there is less trouble from lost motion than there would be if the connection between the index-dies and the clock-movement were at or near the center of the die, as heretofore has been the case.

This construction has the further advantage that each die has a separate independent bearing in the die-plate, instead of being dependent upon each other for bearings, as they must be where the dies nest one within the other. As each die rests directly upon the die-plate, it is impossible for the blow on one die to affect any other die or any part of the clock-movement, as all the force exerted on each die is transmitted directly to the die-plate. Irrespective of these structural advantages the impression is much more easily read than when the index-dies are arranged concentric with each other, for in that case one of the indexes is necessarily so small as not to be easily seen, especially when the impression is somewhat indistinct, as is frequently the case with this class of stamps. Moreover, whenever the two concentric indexes are in line with each other, which occurs forty-eight times each day, it is hard to distinguish what time is indicated unless one is well acquainted with the stamp and thoroughly understands its markings. In my stamp there is no probability of its record being misunderstood, and it is as clear one part of the day as another.

It is evident that the figures or characters or dial-dies around the hour and minute index dies may be made upon circles raised from the die-plate B, and the holes through the plate C be made large enough to inclose them, instead of being made upon the plate C, without departing from my invention in the least.

What I claim as new is—

1. In a chronometric stamp, a die-plate provided with one dial-die having characters representing the hours of the day, a second dial-die having characters indicating the minutes or divisions of the hour, each of said dies being provided with a recess to receive an index-die, in combination with index-dies having their acting faces on the same plane as the acting faces of the dial-dies, each index being by a time-movement turned in a separate recess surrounded by a different dial-die, and each index being set in a separate bearing adapted to support said index against the force of the impression in printing independently of the other index-dies, and a device constructed to press upon said dial and index dies, all substantially as described.

2. In a chronometric stamp, an impression device, a time-movement, a die-plate provided with meridian, hour, and minute dial-dies and meridian, hour, and minute index-dies, each index-die working in a separate recess in a different dial-die, and supported on its own center independently of the others on the same plane as the dial-dies, and each connected with the time-movement by wheels as large, or nearly so, as the periphery of the dies, all substantially as and for the purpose specified.

BENJAMIN B. HILL.

Witnesses:
T. A. CURTIS,
IRA B. ALLEN.